(No Model.) 2 Sheets—Sheet 1.
F. L. PERRY.
VEHICLE GEAR.
No. 397,932. Patented Feb. 19, 1889.
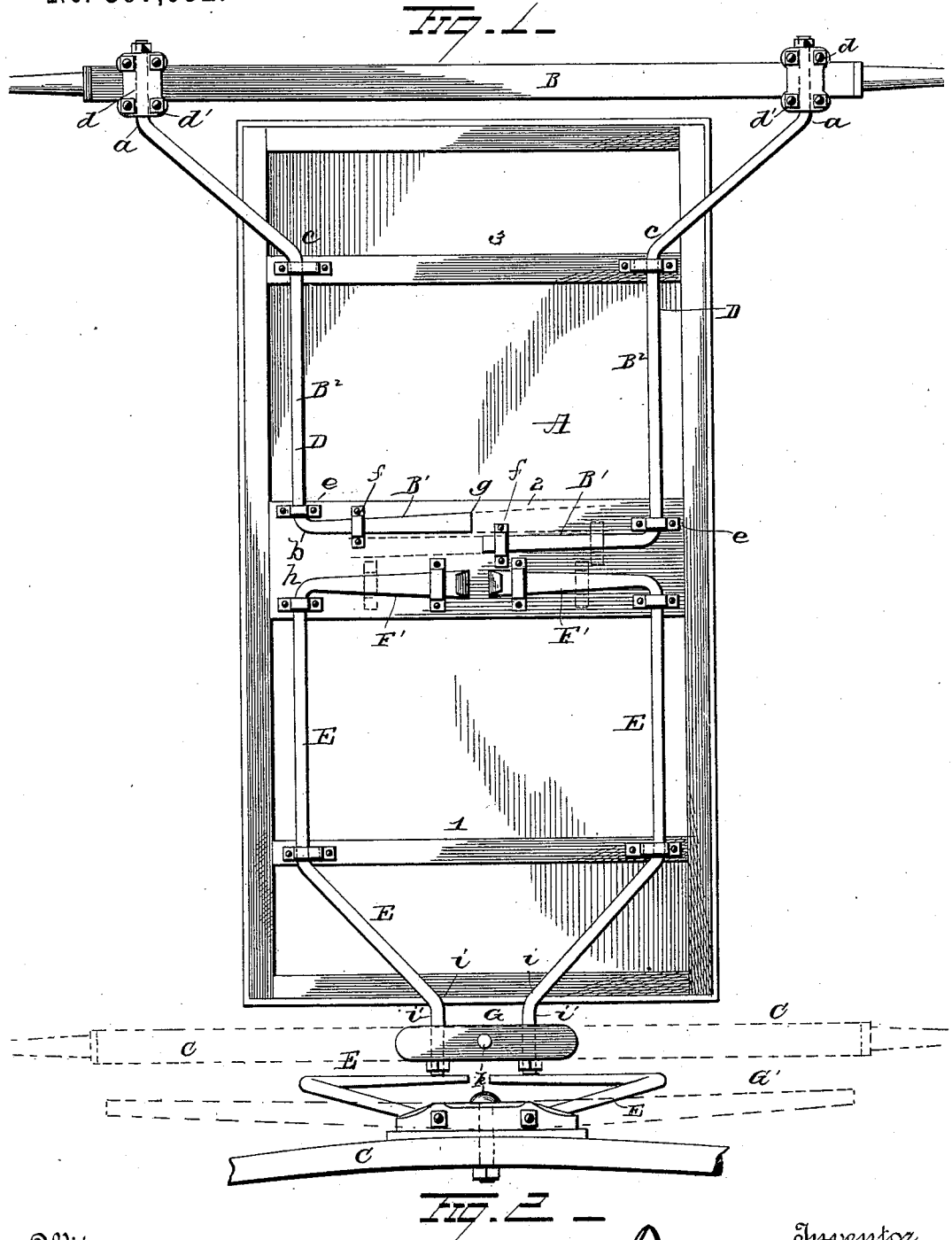
Witnesses:
Inventor
Francis L. Perry
By his Attorney
H. A. Seymour.

(No Model.) 2 Sheets—Sheet 2.
F. L. PERRY.
VEHICLE GEAR.
No. 397,932. Patented Feb. 19, 1889.
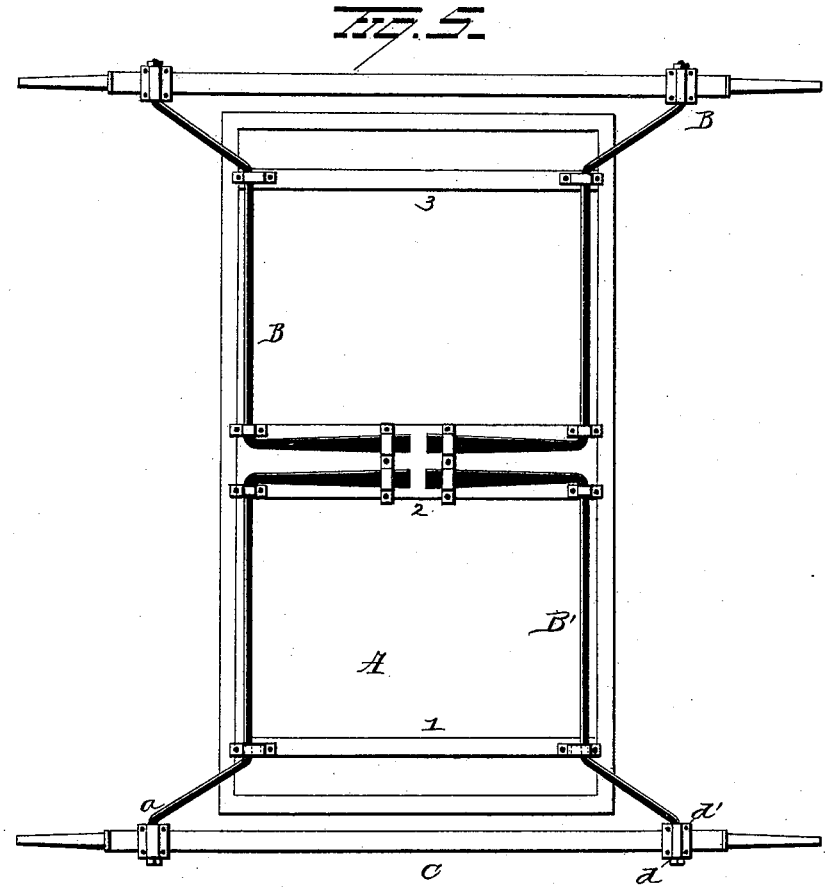
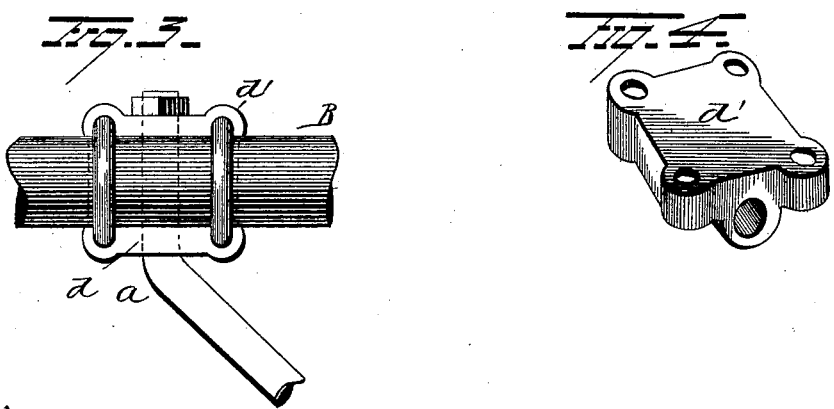
Witnesses.
O. Nottingham
Albert Popkin
Inventor,
Francis L. Perry
By his Attorney
H. A. Seymour.

UNITED STATES PATENT OFFICE.

FRANCIS L. PERRY, OF BROOKLYN, NEW YORK.

VEHICLE-GEAR.

SPECIFICATION forming part of Letters Patent No. 397,932, dated February 19, 1889.

Application filed July 27, 1888. Serial No. 281,230. (No model.)

*To all whom it may concern:*

Be it known that I, FRANCIS L. PERRY, a resident of Brooklyn, in the county of Kings and State of New York, have invented certain new and useful Improvements in Vehicle-Gears; and I do hereby declare the following to be a full, clear, and exact description of the invention, such as will enable others skilled in the art to which it appertains to make and use the same.

My invention relates to an improvement in vehicle-gears, one object being to dispense with an ordinary reach-pole, and by the provision of peculiarly-constructed torsional springs afford a simple elastic connection of the body with the axles that may be adjusted to suit different loads.

A further object is to provide a pair of duplicate torsional springs for a two or four wheeled vehicle, which will also serve as diagonal braces to the engaged axle.

A further object is to construct torsional springs for the direct connection of the vehicle-body to the axle, so that said springs will be adapted to have a torsional spring action in a portion of their bodies and a flexible movement in other portions of the same.

A further object is to provide a set of torsional springs that will serve to elastically connect the body direct to the front axle of a four-wheeled vehicle in a manner to permit a swivel movement of the axle and normally hold the axle and body in parallel lines.

With these objects in view my invention consists in certain features of construction and combinations of parts, which will be hereinafter described, and indicated in the claims.

Referring to the drawings making a part of the specification, Figure 1 is a bottom plan view of a four-wheeled vehicle-body, showing the preferred form of my improved gear-connections in position to attach the body to the axles, which are also shown. Fig. 2 is a front elevation of the front axle and attached springs. Fig. 3 is a top plan view of the rear portion of the vehicle and rear axle attached thereto. Fig. 4 is a detached view of the clip-plates used to connect the rear axle with the ends of the torsion-springs, or it may be used on the cross-bar when desired. Fig. 5 is a bottom plan view of a modification in which the springs are alike on the front and rear portions of the vehicle, the front springs being attached to the cross-bar or bolster.

A represents a vehicle-body, B a rear axle, and C a front axle. The body is provided with a stable frame, to which the cross-pieces 1 2 3 are affixed on the under side of said body, the center piece, 2, being of sufficient width to receive the ends of the springs D E, as will be explained more fully.

The springs D, that are preferably located to be attached by their ends $a$ to the rear axle, B, have their forward portions, B', bent at a right angle at $b$, so as to project these portions toward or beyond the longitudinal center of the body and adjacent to each other. The portions of the springs B' are flattened to produce plate-springs B' from $b$ to the terminal ends of each, the other portions of the springs being preferably made round in cross-section. The rounded portions $B^2$, that have torsional action when in operation, are bent outwardly at $c$ to extend beyond the sides of the vehicle-body in a diagonal direction rearward, and engage the rear axle, B, at $d$, where the ends of the spring-bodies are inserted and secured in the clip-plates $d'$ in any suitable manner, said plates being clipped or shackled to the axle near the spindles of the same, either upon the top or bottom side of the same, as may be preferred.

At or near the points $c$, where the torsion-springs $B^2$ are outwardly bent in a diagonal direction, as stated, they are loosely clipped or otherwise secured to the rear cross-pieces, 3, in a manner to permit them to twist longitudinally under load strain, and similar clips, $e$, are affixed to the center cross-piece, 2, of the body to loosely secure the rounded rods of the torsion-springs $B^2$ upon this cross-piece near the angles at $b$, where these cylindrical rod-springs are bent inwardly and flattened into plate-springs B'.

The bends in the springs $B^2$ at $c$ are set so as to cause the portions which extend diagonally outward to also incline downwardly from that point a suitable distance, in order to elevate the vehicle-body a proper distance above the axle, to which the ends of the springs are adjusted, as before stated.

The flattened portions or plate-spring extensions B' of the torsion-springs $B^2$ are attached loosely by loops or clips $f$ to the cross-piece 2, on which they lie, and they are thus adapted to flex or bow downwardly when in action under a load that puts a torsional strain on the bodies of the springs B².

It is evident that a change of position of the clips $f$ toward or from the terminal ends $g$ of the plate-springs B' will render them more or less rigid in action, as if they are clipped near these ends, which are preferably turned into an open loop at their terminals, they will be rendered capable of increased flexure and consequent increased elasticity, whereas if clipped nearer to the corner bends, $c$, they will be rendered stiff and capable of sustaining a greater load before flexing.

If desired, the ends of the plate-springs B' may be extended, as shown in Fig. 1, so as to give a greater range to their flexure, these extended ends lying parallel to each other, but sufficiently removed to allow free or independent action.

In the preferred form of construction shown in Fig. 1 the front springs, E, are made of the same material in cross-section as the rear springs, D, these springs E being the torsional portions of compound torsional and flexing springs which in action operate similarly to the rear springs. At the corners $h$ the portions F' are turned inwardly and flattened to form plate-springs, which latter are loosely clipped to the center cross-piece, 2, of the body, a sufficient distance intervening between these plate-springs and those that are integral with the rear springs, B, to permit them to work properly.

Upon the front cross-piece, I, of the body the rounded portional springs F are clipped to afford free twisting action throughout the length of the springs, and in front of these points of clipped connection the spring-bodies E are bent inwardly and forwardly to a point, $i$, where they are again bent forwardly and parallel to each other, thus providing ends $i'$, that enter holes in a center plate, G, which latter is swiveled to the front axle, C, by a king-bolt, $k$.

If desired, the vehicle-body may seat directly upon the center plate, G, it being understood that there is a mating wear-plate provided at the point of frictional contact of the body with the center plate, G. It is, however, expedient to provide a cross-bar, G', (shown in dotted lines in Fig. 2,) the ends of which sustain the body of the vehicle, while its central portion is swiveled upon the center plate, G, and loosely attached thereto by a king-bolt, $k$.

It should be further explained that the diagonal portions of the springs F, which extend inwardly and forwardly from the point $i$, are also inclined downwardly from said point to correspond with the inclination of the rear springs where they approach the rear axle to be attached to it, thus holding the body in a horizontal plane.

In operation the peculiar method of connecting the compound integral torsion and flexing springs provided affords a smooth elastic yielding movement vertically, and at the same time they act as braces and equalizing-bars to prevent side sway or jolting from encounter of the wheels with rough road-bed or chuck-holes in the same, the spring action being distributed to sustain the load evenly, if the same is heavier on either side of the vehicle-seat.

By the provision of the diagonal extensions of the springs B' and F to engage the front and rear axle these springs are stiffened and braced to resist percussion incidental to the abutment of the wheels against stones or other rigid obstacles on a rough road, and thus render these springs of efficient service to take the place of a reach-pole, which is dispensed with.

It is apparent that the springs B' B², if applied to a sulky, dog-cart, or other two-wheeled vehicle, will operate effectually to absorb jar and give a smooth easy vertical spring movement without side lurch or objectionable jogging action.

In Fig. 5 a method of construction is shown in which the springs B' B² are applied to the front and rear axles. In this case the ends of the springs are fastened to the ends of a cross-bar by clips or other means, said bar being swivel-connected to the axle by any preferred method usual for such purpose. The latter method of construction will afford free vertical spring action by the co-operation of the flexing ends of the plate-springs with the integral torsion-springs, and also prevent side vibration of the vehicle-body to a great extent.

Slight changes might be made in the minor details of construction of this vehicle-gear without exceeding the scope or spirit of my invention; hence I do not desire to restrict its construction to the exact forms herein shown; but, Having fully described my invention, what I claim as new, and desire to secure by Letters Patent, is—

1. The combination, with a body and a rear axle, of two torsional rod-springs that are bent diagonally outward in a plane to properly engage the rear axle, and are flattened in their bodies nearer the front ends, where they are loosely clipped to the vehicle-body and coact by flexure with the torsional springs to yieldingly support load strains, substantially as set forth.

2. The combination, with a vehicle-body and a front axle, of two torsional springs loosely held to the body, and having their forward ends bent diagonally forward and inward to engage a center plate, and their bodies flattened nearer their other ends to afford integral plate-springs, which are adapted to flex when weight is thrown on the torsion-springs, substantially as set forth.

3. The combination, with a vehicle-body and a front axle, of two torsional rod-springs loosely held to the body, and having their forward ends bent to engage a center plate and their other ends flattened to produce plate-springs, which are bent at an angle to the integral rod-springs, and a center plate secured to the ends of the rod-springs and swivel-connected to the axle, substantially as set forth.

4. The combination, with a vehicle-body and a front axle, of two torsional springs loosely secured to the lower side of the body, having their forward portions bent diagonally to engage a cross-bar, a cross-bar, and a swivel-connection for the cross-bar to the axle, substantially as set forth.

5. The combination, with a vehicle-body, a rear axle, a front axle, and a center plate, of two torsional rod-springs bent to form braces and be engaged to the center plate, having their other ends flattened to produce flexible plate-springs, and a second set of torsional rod-springs bent outward and rearward near their rear ends to engage the rear axle, and having their other ends flattened and bent inwardly to afford flexing plate-springs, the flattened ends of both sets of springs being loosely clipped to the under side of the vehicle-body, substantially as set forth.

In testimony whereof I have signed this specification in the presence of two subscribing witnesses.

FRANCIS L. PERRY.

Witnesses:
CHAS. S. DRURY,
WM. P. PATTON.